(12) United States Patent
Yu

(10) Patent No.: US 11,747,929 B2
(45) Date of Patent: Sep. 5, 2023

(54) TOUCH DISPLAY SCREEN AND MOBILE TERMINAL

(71) Applicant: JRD Communication (Shenzhen) LTD., Guangdong (CN)

(72) Inventor: Yang Yu, Guangdong (CN)

(73) Assignee: JRD Communication (Shenzhen) LTD., Shenzhen (CN)

( * ) Notice: Subject to any disclaimer, the term of this patent is extended or adjusted under 35 U.S.C. 154(b) by 0 days.

(21) Appl. No.: 17/615,831

(22) PCT Filed: Nov. 22, 2019

(86) PCT No.: PCT/CN2019/120208
§ 371 (c)(1),
(2) Date: Dec. 2, 2021

(87) PCT Pub. No.: WO2021/051643
PCT Pub. Date: Mar. 25, 2021

(65) Prior Publication Data
US 2022/0326795 A1    Oct. 13, 2022

(30) Foreign Application Priority Data

Sep. 17, 2019    (CN) .......................... 201910877791.9

(51) Int. Cl.
*G06F 3/041*    (2006.01)

(52) U.S. Cl.
CPC ........ *G06F 3/0412* (2013.01); *G06F 3/04164* (2019.05)

(58) Field of Classification Search
None
See application file for complete search history.

(56) References Cited

U.S. PATENT DOCUMENTS

| | | |
|---|---|---|
| 10,429,986 B2 | 10/2019 | Kim et al. |
| 11,175,697 B2 | 11/2021 | Jeong et al. |
| 2014/0002385 A1 | 1/2014 | Ka et al. |
| 2015/0212548 A1 | 7/2015 | Namkung et al. |
| 2016/0293870 A1 | 10/2016 | Nakagawa |

(Continued)

FOREIGN PATENT DOCUMENTS

| | | |
|---|---|---|
| CN | 106502442 | 3/2017 |
| CN | 107025014 | 8/2017 |

(Continued)

OTHER PUBLICATIONS

International Search Report and the Written Opinion dated May 27, 2020 From the International Searching Authority Re. Application No. PCT/CN2019/120208 and Its Translation of Search Report Into English. 7 Pages).

(Continued)

*Primary Examiner* — Brian M Butcher

(57) ABSTRACT

The present application relates to a touch display screen and a mobile terminal. The touch display screen comprises a flat display area, a curved display area and a circuit area which are connected in sequence; the curved display area is bent to be arc-shaped; and the circuit area is located below the flat display area, wherein the touch display screen further comprises a plurality of touch lines, and signal input ends of the plurality of touch lines are all located in the circuit area.

6 Claims, 4 Drawing Sheets

(56) References Cited

U.S. PATENT DOCUMENTS

2017/0212637 A1* 7/2017 Choi .................... G06F 3/0445
2018/0081399 A1* 3/2018 Kwon .................... G09G 5/00
2020/0372850 A1 11/2020 He et al.
2021/0335837 A1 10/2021 Lee et al.
2021/0357052 A1* 11/2021 Ye ....................... H01L 51/5281

FOREIGN PATENT DOCUMENTS

| CN | 107688415 | 2/2018 |
| CN | 207082533 | 3/2018 |
| CN | 108598142 | 9/2018 |
| CN | 109521911 | 3/2019 |
| CN | 109559644 | 4/2019 |
| CN | 109560109 | 4/2021 |
| WO | WO2019/041237 | 3/2019 |

OTHER PUBLICATIONS

Notification of Office Action and Search Report dated Jul. 21, 2020 From the State Intellectual Property Office of the People's Republic of China Re. Application No. 201910877791.9 and Its Translation of Office Action Into English. (16 Pages).

Notice of Allowance dated Apr. 8, 2021 From the State Intellectual Property Office of the People's Republic of China Re. Application No. 201910877791.9 and Its Translation of Office Action Into English. (6 Pages).

* cited by examiner

TOUCH DISPLAY SCREEN AND MOBILE TERMINAL

RELATED APPLICATIONS

This application is a National Phase of PCT Patent Application No. PCT/CN2019/120208 having International filing date of Nov. 22, 2019, which claims the benefit of priority of Chinese Patent Application No. 201910877791.9 filed on Sep. 17, 2019. The contents of the above applications are all incorporated by reference as if fully set forth herein in their entirety.

FIELD AND BACKGROUND OF THE INVENTION

The present invention relates to a display technology, and more particularly, to a touch screen and a mobile terminal.

As the rapid development of the display technology, consumers have demands for a thinner display having a narrower side frame.

However, in the conventional display, because the display modules and the circuit board need to be bonded with the display panel, the display panel needs to reserve enough non-displaying area for bonding. This makes the non-displaying area of the display panel is larger and thus makes it difficult to narrow the side frame.

SUMMARY OF THE INVENTION

Technical Problem

One objective of an embodiment of the present invention is to provide a touch screen and a mobile terminal to achieve the purpose of a narrow side frame and a high screen-to-body ratio.

Technical Solution

According to an embodiment of the present invention, a touch screen is disclosed. The touch screen comprises: a flat display area; a curved display area, in an arc shape having a central angle not less than 90 degrees and a radius ranged between 0.5-2 millimeters; a circuit area, located below the flat display area; and a plurality of touch lines, having signal input ends located in the circuit area; wherein the flat display area, the curved display area and the circuit area are connected in order.

Optionally, the circuit area comprises a fan out area and a bonding area. The fan out area is located between the bonding area and the curved display area and the signal input ends of the touch lines are all located in the bonding area.

Optionally, the fan out area is bended toward the flat display area in an arc shape and a radius of the fan out area is greater than the radius of the curved display area.

Optionally, a radius of the fan out area is between 3-5 millimeters.

Optionally, the touch lines comprise a first touch line and a second touch line crossed each other. The first touch line extends through a first predetermined direction in the flat display area. The second touch line extends through a second predetermined direction in the flat display area. At least one end of the first touch line is the signal input end and at least one end of the second touch line is the signal input end.

Optionally, two ends of the first touch lines are both the signal input ends and one end of the second touch line is the signal input end.

Optionally, the flat display area and the curved display area constitute a display area of the touch screen. The touch screen further comprises a first circuit area and a second circuit area oppositely located at two sides of the display area and electrically connected to the circuit area. The first touch line surrounds a boundary of the display area and extends toward the circuit area in the first circuit area and the second circuit area. The second touch line extends toward the circuit area in the display area.

According to an embodiment of the present invention, a touch screen includes a flat display area, a curved display area in an arc shape, a circuit area located below the flat display area, and a plurality of touch lines having signal input ends located in the circuit area. The flat display area, the curved display area and the circuit area are connected in order.

Optionally, the curved display area is in an arc shape having a central angle not less than 90 degrees.

Optionally, the curved display area has a radius ranged between 0.5-2 millimeters.

Optionally, the circuit area comprises a fan out area and a bonding area. The fan out area is located between the bonding area and the curved display area and the signal input ends of the touch lines are all located in the bonding area.

Optionally, the fan out area is bended toward the flat display area in an arc shape and a radius of the fan out area is greater than the radius of the curved display area.

Optionally, a radius of the fan out area is between 3-5 millimeters.

Optionally, the touch lines comprise a first touch line and a second touch line crossed each other. The first touch line extends through a first predetermined direction in the flat display area. The second touch line extends through a second predetermined direction in the flat display area. At least one end of the first touch line is the signal input end and at least one end of the second touch line is the signal input end.

Optionally, two ends of the first touch lines are both the signal input ends and one end of the second touch line is the signal input end.

Optionally, the flat display area and the curved display area constitute a display area of the touch screen. The touch screen further comprises a first circuit area and a second circuit area oppositely located at two sides of the display area and electrically connected to the circuit area. The first touch line surrounds a boundary of the display area and extends toward the circuit area in the first circuit area and the second circuit area. The second touch line extends toward the circuit area in the display area.

According to an embodiment of the present invention, a mobile terminal includes a touch screen. The touch screen includes a flat display area, a curved display area in an arc shape, a circuit area located below the flat display area, and a plurality of touch lines having signal input ends located in the circuit area. The flat display area, the curved display area and the circuit area are connected in order.

Optionally, the curved display area is in an arc shape having a central angle not less than 90 degrees.

Optionally, the curved display area has a radius ranged between 0.5-2 millimeters.

Optionally, the circuit area comprises a fan out area and a bonding area. The fan out area is located between the bonding area and the curved display area and the signal input ends of the touch lines are all located in the bonding area.

Optionally, the fan out area is bended toward the flat display area in an arc shape and a radius of the fan out area is greater than the radius of the curved display area.

Optionally, a radius of the fan out area is between 3-5 millimeters.

Advantageous Effects

In contrast to the conventional art, the touch screen comprises orderly connected a flat display area, a curved display area and a circuit area. The curved display area is in an arc shape. The circuit area is below the flat display area. The touch screen further comprises a plurality of touch lines, having signal input ends located in the circuit area. Because the edge of the display area is designed as an arc-shape structure, the circuit area connected to the edge area is located under the display area. In this way, the side frame of the display screen could be smaller and thus the screen-to-body ratio could be raised.

BRIEF DESCRIPTION OF THE SEVERAL VIEWS OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF SPECIFIC EMBODIMENTS OF THE INVENTION

For the purpose of description rather than limitation, the following provides such specific details as a specific system structure, interface, and technology for a thorough understanding of the application. However, it is understandable by persons skilled in the art that the application can also be implemented in other embodiments not providing such specific details. In other cases, details of a well-known apparatus, circuit and method are omitted to avoid hindering the description of the application by unnecessary details.

Conventionally, because the driving modules and circuit boards needs to be bonded with the display panel, there should be enough non-display area on the display as the bonding area. Accordingly, the size of the non-display area cannot be reduced and thus it's hard to achieve the narrow side frame. In order to solve the above issue, a novel touch screen is provided to achieve the narrow side-frame and a high screen-to-body ratio.

Figure 1:
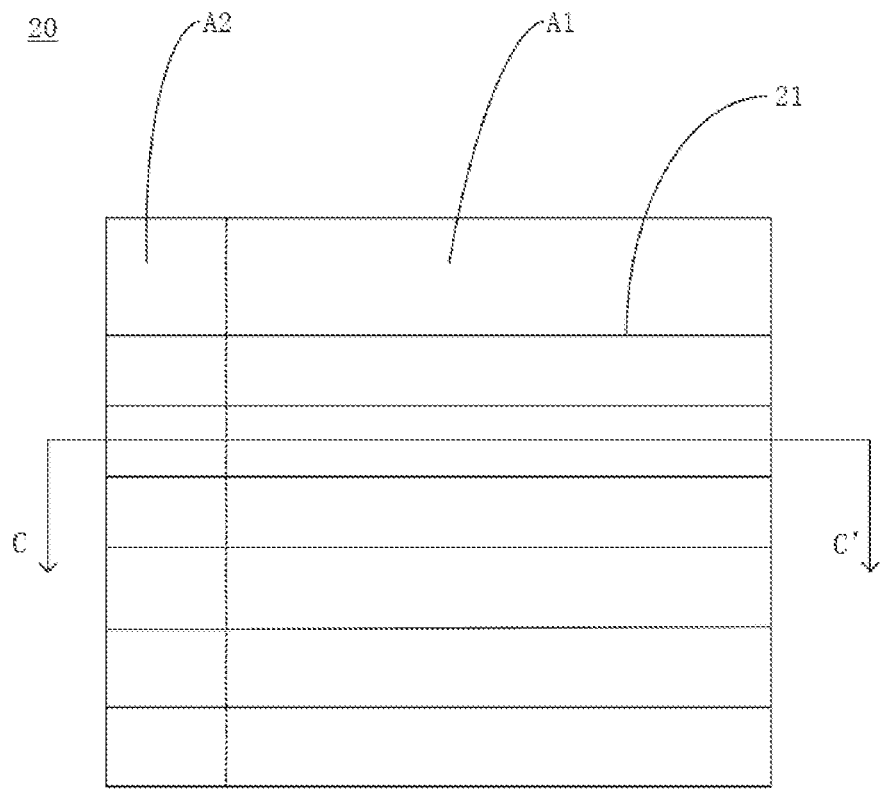
FIG. 1 is a diagram of a touch screen according to an embodiment of the present invention.
Figure 2:
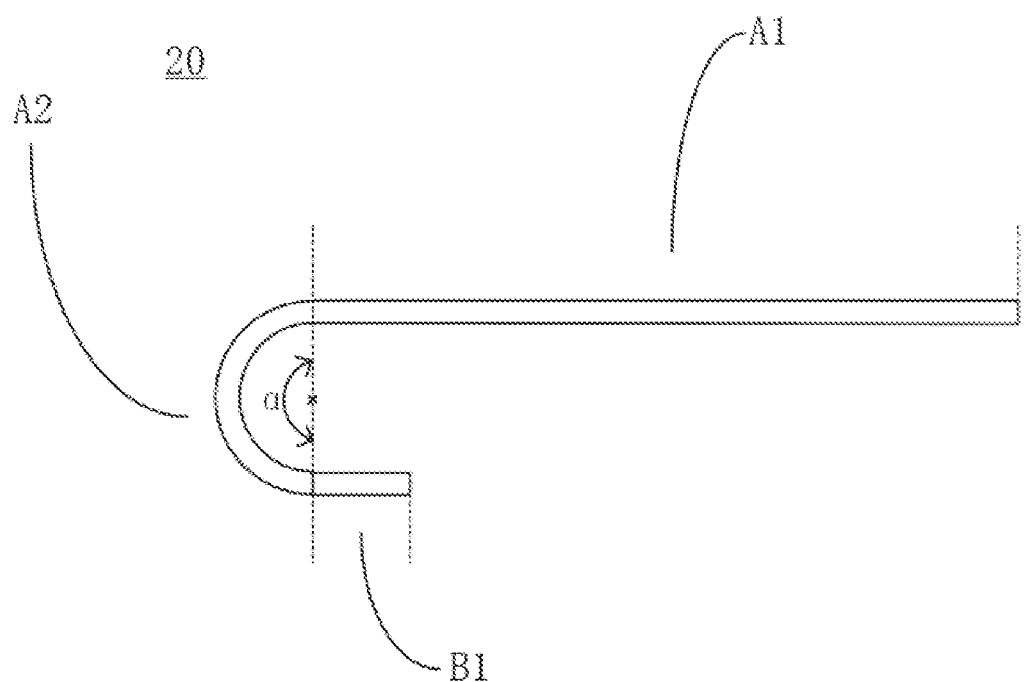
FIG. 2 is a cross-section view along the line C-C' shown in FIG. 1.

Please refer to FIG. 1 and FIG. 2. FIG. 1 is a diagram of a touch screen according to an embodiment of the present invention. FIG. 2 is a cross-section view along the line C-C' shown in FIG. 1. As shown in FIG. 1 and FIG. 2, the touch screen comprises a flat display area A1, a curved display area A2 and a circuit area B1. In this embodiment, the curved display area is bended in an arc shape. The circuit area B1 is located below the flat display area A1. Specifically, the touch screen 100 further comprises a plurality of touch lines, having signal input ends located in the circuit area B1.

Figure 3:
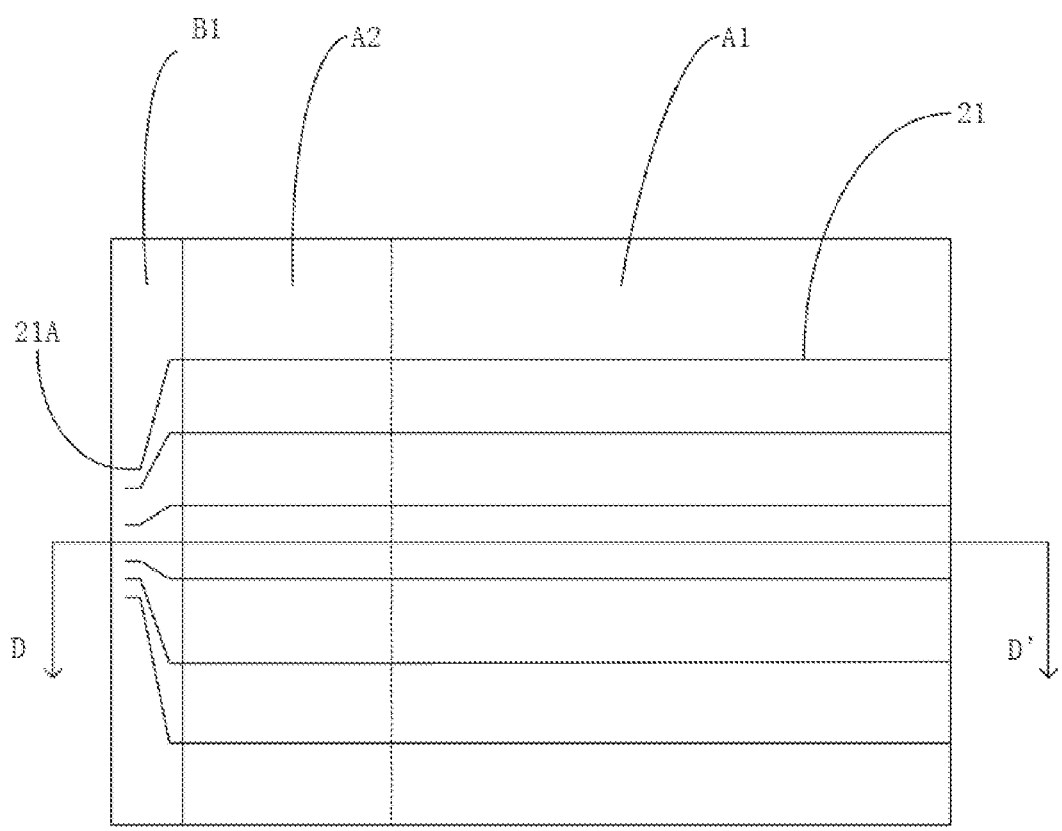
FIG. 3 is a diagram of the touch screen if the curved display area is flattened shown in FIG. 1.
Figure 4:
FIG. 4 is a cross-section view along the line D-D' shown in FIG. 3.

In this embodiment, if the curved display area A2 is flattened, then the touch screen is shown in FIG. 3 and FIG. 4. As shown in FIG. 3 and FIG. 4, the one end 21A of the touch line 21 in the circuit area is the signal input end. In the actual implementation, the signal input end 21A is connected to the external driving circuit of the touch screen for implementing the touch function of the touch screen. Furthermore, it could be seen, from comparing FIG. 1 with FIG. 3, that the edge of the display area (i.e. the curved display area A2) is designed as an arc-shape bending structure. This could move the circuit area B1 connected to the edge of the display area to the area below the display area. In this way, the visual width of the circuit area B1 on the display surface of the touch screen could be reduced.

If the central angle α of the arc-shape curved display area A2 is not less than 180 degrees, the circuit area B1 is right under the flat display area A1. If the central angle α of the arc-shape curved display area A2 is less than 180 degrees, circuit area B1 is under the flat display area A1 and at a side of the flat display area A1. Specifically, if the central angle α of the arc-shape curved display area A2 is not less than 90 degrees, the circuit area B1 is right under a display area constituted by the curved display area A2 and the flat display area A1. Thus, the circuit area cannot be observed from the display surface of the touch screen and a visual effect of no-side-frame is achieved. If the central angle α of the arc-shape curved display area A2 is less than 90 degrees, the circuit area B1 is under and the curved display area A2 under a display area constituted by the curved display area A2 and the flat display area A1 and at a side of that display area and has an angle with the flat display area A1. Thus, the visual effect of a narrow-side-frame is achieved.

In addition to the above-mentioned central angle α of the arc-shape curved display area A2, a curved radius is also an important parameter to evaluate the bending degree. If the curved radius is greater, the bending degree is higher. In this embodiment, the curved radius should be appropriate, such as 0.5-2 millimeters. This could prevent the pixel circuits and layer structures in the curved display area A2 form being damaged.

Figure 5:
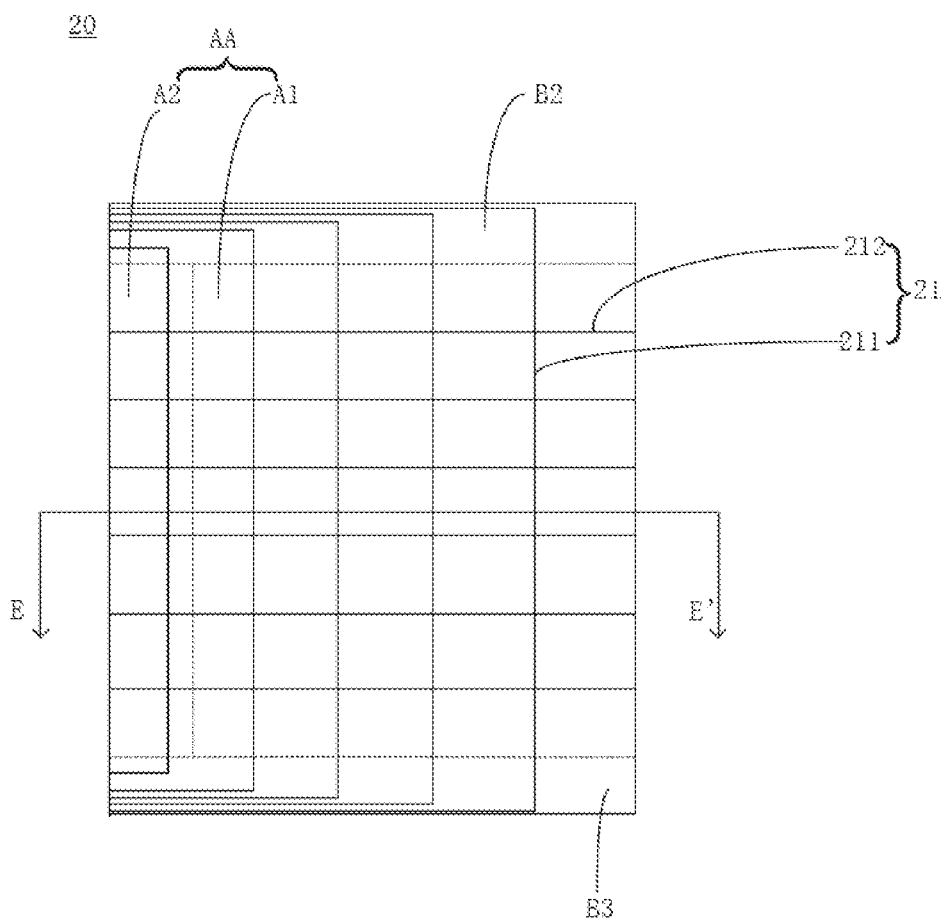
FIG. 5 is a diagram of a touch screen according to another embodiment of the present invention.
Figure 6:
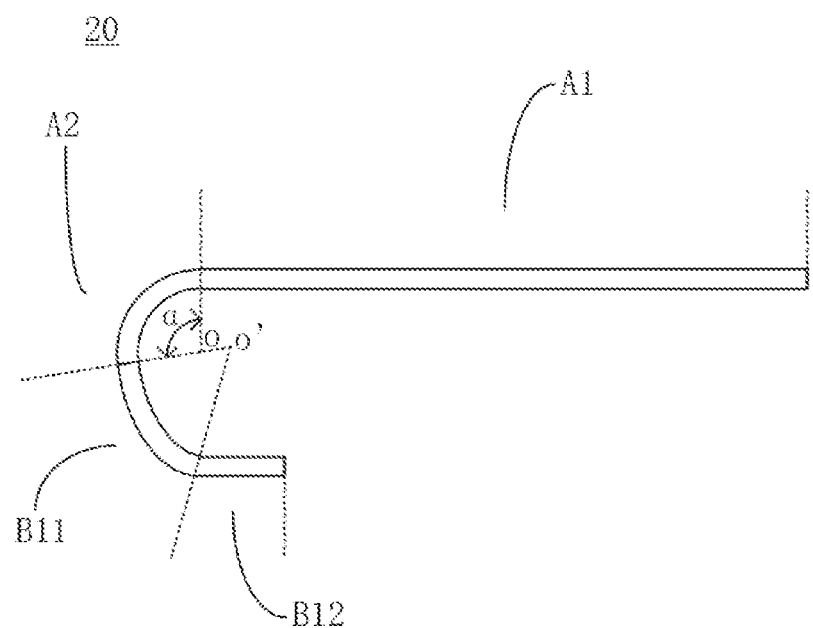
FIG. 6 is a cross-section view along the line E-E' shown in FIG. 5.
Figure 7:
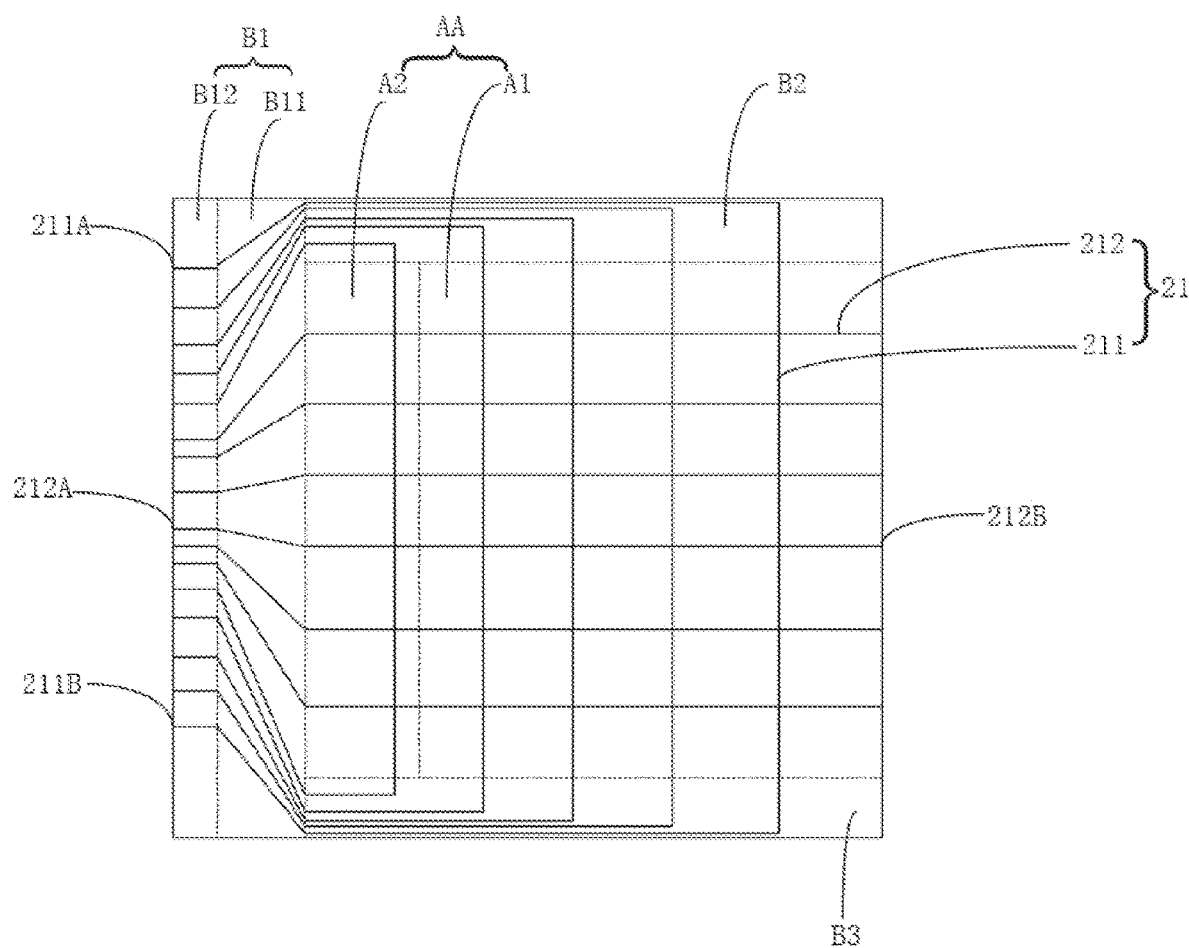
FIG. 7 is a diagram of the touch screen if the curved display area is flattened shown in FIG. 5.

In an embodiment, if the curved display area A2 only allows a certain bending degree, then the circuit area B1 could also be bended in addition to the curved display area A2. Specifically, as shown in FIG. 5-FIG. 7, the circuit area B1 could comprise a fan out area B11 and a bonding area B12. Here, the fan out area B11 is located between the bonding area B12 and the curved display area A2. Furthermore, the fan out area B11 could be bended toward the flat display area A1. The signal input ends of the above-mentioned touch lines 12 are all located in the bonding area B12.

The bonding area B12 could further comprise pins (not shown) for connecting to the external driving circuit. In this embodiment, the touch lines in the circuit area B1 are gathered together to form a fan shape in the fan out area B11 and the signal input ends of the gathered touch lines 21 are distributed near the pints of the external driving circuit. In this way, the bonding area B12 can allow a comparatively low bending degree and the fan out area B11 has a better bending performance then the bonding area B12. Therefore, in this embodiment, the fan out area B11 in the circuit area B1 is preferably bended.

Considering the bending performance of the fan out area B11 is not better than the bending performance of the curved display area A2. The curved radius of the fan out area B11 is greater than the curved radius of the curved display area A2 such that the bending degree of the fan out B11 is lower than the bending degree of the curved display area. For example, the curved radius of the curved display area A2 could be 0.5-2 mm and the curved radius of the fan out area B11 could be 3-5 mm.

In an embodiment, as shown in FIG. 5 and FIG. 7, the touch lines 21 could comprise a first touch line 211 and a second touch line 212 crossed each other. Here, the first touch line 211 extends through a first predetermined direction in the flat display area A1. The second touch line 212 extends through a second predetermined direction in the flat display area A1. For example, the first touch line 211 extends through a vertical direction in the flat display area A1 and the second touch line 212 extends through a horizontal direction in the flat display area A1.

One of the first touch line 211 and the second touch line is a touch driving electrode and the other one is the touch sensing electrode. Specifically, the signal input ends of the first touch line 211 and the second touch line 212 are both in the circuit area B1 to electrically connect to the external driving circuit. For example, as shown in FIG. 7, one end 211A of the first touch line 211 is the signal input end and another end 211B is also a signal input end. One end 212A of the second touch line 212 is the signal input end but another end 212B is not the signal input end and located in the flat display area A1.

Please refer to FIG. 7 again. The flat display area A1 and the curved display area A2 constitute the display area AA of the touch screen 20. The touch screen 20 could further comprise a first circuit area B2 and a second circuit area B3. Here, the first circuit area B2 and the second circuit area B3 are oppositely located at two sides of the display area and electrically connected to the circuit area B1. The first touch line 211 surrounds a boundary of the display area AA and extends toward the circuit area B1 in the first circuit area B3 and the second circuit area B3. The second touch line 212 extends toward the circuit area B1 in the display area AA.

For example, the first circuit area B2 could be located at the top edge of the display area AA and correspond to the top side frame of the touch screen 20. The second circuit area B3 could be located at the bottom edge of the display area AA and correspond to the bottom side frame of the touch screen 20. The circuit area B1 could be located at the left edge of the display area AA and correspond to the left side frame of the touch screen 20. Because one end 212B of the second touch line 212, extending horizontally, is in the display area AA and another end 212A is the signal input end and located in the circuit area B1. There is no right side frame of the touch screen 20. In addition, through arranging the central angle of the arc-shape curved display area A2 to be not less than 90 degrees, the left side frame corresponding to the circuit area B1 cannot be visually observed. In this way, there is visually no side frame at the left side and the right side. Furthermore, because the first touch line 211 surrounds the boundary of the display area AA and thus the top side frame and the bottom side frame are smaller and could be ignored. Accordingly, the above touch screen could achieve no-side-frame visual effect.

In contrast to the conventional art, the touch screen comprises orderly connected a flat display area, a curved display area and a circuit area. The curved display area is in an arc shape. The circuit area is below the flat display area. The touch screen further comprises a plurality of touch lines, having signal input ends located in the circuit area. Because the edge of the display area is designed as an arc-shape structure, the circuit area connected to the edge area is located under the display area. In this way, the side frame of the display screen could be smaller and thus the screen-to-body ratio could be raised.

Furthermore, a mobile terminal is disclosed. The mobile terminal comprises the touch screen of any one of the above embodiments. Here, the touch screen comprises orderly connected a flat display area, a curved display area and a circuit area. The curved display area is in an arc shape. The circuit area is below the flat display area. The touch screen further comprises a plurality of touch lines, having signal input ends located in the circuit area.

In contrast to the conventional art, the touch screen, because the edge of the display area is designed as an arc-shape structure, the circuit area connected to the edge area is located under the display area. In this way, the side frame of the display screen could be smaller and thus the screen-to-body ratio could be raised.

Above are embodiments of the present invention, which does not limit the scope of the present invention. Any modifications, equivalent replacements or improvements within the spirit and principles of the embodiment described above should be covered by the protected scope of the invention.

What is claimed is:

1. A touch screen comprising:
   a flat display area;
   a curved display area, in an arc shape having a central angle not less than 90 degrees and a radius ranged between 0.5-2 millimeters;
   a circuit area, located below the flat display area; and
   a plurality of touch lines, having signal input ends located in the circuit area;
   wherein the flat display area, the curved display area and the circuit area are connected in order,
   wherein the circuit area comprises a fan out area and a bonding area, wherein the fan out area is located between the bonding area and the curved display area and the signal input ends of the touch lines are all located in the bonding area, and
   wherein the fan out area is bent toward the flat display area in an arc shape and a radius of the fan out area is greater than the radius of the curved display area.

2. The display screen of claim 1, wherein a radius of the fan out area is between 3-5 millimeters.

3. The display screen of claim 1, wherein the touch lines comprise a first touch line and a second touch line crossed each other; the first touch line extends through a first predetermined direction in the flat display area; the second touch line extends through a second predetermined direction in the flat display area; and at least one end of the first touch line is the signal input end and at least one end of the second touch line is the signal input end.

4. The touch screen of claim 3, wherein two ends of the first touch line are both the signal input ends and one end of the second touch line is the signal input end.

5. The touch screen of claim 4, wherein the flat display area and the curved display area constitute a display area of the touch screen; the touch screen further comprises a first circuit area and a second circuit area oppositely located at two sides of the display area and electrically connected to the circuit area; the first touch line surrounds a boundary of the display area and extends toward the circuit area in the first circuit area and the second circuit area; and the second touch line extends toward the circuit area in the display area.

6. A mobile terminal, comprising a touch screen comprising:
- a flat display area;
- a curved display area, in an arc shape having a central angle not less than 90 degrees and a radius ranged between 0.5-2 millimeters;
- a circuit area, located below the flat display area; and
- a plurality of touch lines, having signal input ends located in the circuit area;
- wherein the flat display area, the curved display area and the circuit area are connected in order,
- wherein the circuit area comprises a fan out area and a bonding area, wherein the fan out area is located between the bonding area and the curved display area and the signal input ends of the touch lines are all located in the bonding area, and
- wherein the fan out area is bent toward the flat display area in an arc shape and a radius of the fan out area is greater than the radius of the curved display area.

* * * * *